United States Patent Office 3,247,141
Patented Apr. 19, 1966

3,247,141
EMULSION POLISHES COMPRISING POLYETHYLENE, WAX AND RESIN
Harry K. Stryker, Prairie Village, Kans., Arthur F. Helin, Kansas City, Mo., and William H. Gonzales, Overland Park, Kans., assignors, by mesne assignments, to Gulf Oil Corporation, Pittsburgh, Pa., a corporation of Pennsylvania
No Drawing. Filed Apr. 21, 1961, Ser. No. 104,510
6 Claims. (Cl. 260—23)

This invention relates to emulsion polishes and to methods of making the same.

Liquid aqueous emulsion polishes comprising a waxy component and a resin component, including alkali-soluble and alkali-insoluble components, together with leveling and plasticizing agents and fluxes, are well known in the art. The waxy and resinous solids are dispersed in an aqueous phase to form a stable aqueous emulsion or dispersion polish containing between about five and about fifty percent by weight of solids, based on the total weight of the dispersion, depending upon the uses to which the polish is ot be put and the characteristics desired therein. Also depending upon the characteristics desired in the final polish, the dispersed waxy and resinous components thereof can be employed in such proportions that either constitutes between about 5 and about 95 percent by weight of the total solids dispersed.

As waxes suitable for use in such composition, both natural and synthetic waxes have commonly been employed in the prior art. Representative materials include beeswax, carnauba, candelilla, ouricury, esparto, montan, ozokerite, microcrystalline, oxidized microcrystalline, paraffin, palm, whale, and sugarcrane waxes.

Similarly, a wide variety of alkali-soluble and alkali-insoluble natural and synthetic resins are known in the polish formulating art, including: rosin; shellac; Manila loba; terpene resins; terpene phenolic resins; polyvinyl acetate; polyvinyl chloride; polystyrene; polyvinylidene chloride; copolymers of vinyl chloride and vinyl acetate; copolymers of vinylidene chloride and acrylonitrile; vinyl acetate and crotonic acid copolymers; butadiene-styrene copolymers; condensation products of maleic or fumaric anhydride with rosin and mixed polyhydroxy alcohols; condensation products of maleic anhydride and pentaerythritol; condensation products of maleic anhydride and higher molecular weight glycols; and polymers and copolymers of alkyl acrylates and methacrylates. These resins may also be polymers of: allyl acrylate; methallyl acrylate; allyl methacrylate; crotyl acrylate; crotyl methacrylate; allyl methacrylate; allyl cinnamate; methallyl methacrylate; methallyl acrylate; methallyl methacrylate; diallyl phthalate; dimethallyl phthalate; diallyl maleate, succinate, and oxalate; divinyl benzene; dimethallyl and diallyl itaconate; diallyl malonate; diallyl allyl malonate; di- and tri-allyl citrate; diallyl fumarate; dialyl acetone; divinyl ether; diallyl ether; dimethallyl ether; ethylene diacrylate and dimethacrylate; glyceryl diacrylates and methacrylates; trivinyl benzene, etc.; and mixtures of the various aforementioned resins.

Suitable leveling agents, plasticizers, or fluxes, known to the art for use in wax polish formulations include phthalate plasticizers such as dibutyl phthalate, alkyl phosphate plasticizers such as tributyl phosphate or tributoxyethyl phosphate, n-octanol, and the fluoroalkyl leveling agents taught in U.S. Patent 2,937,098.

In an attempt to improve liquid emulsion waxes of the type described, the prior art has substituted polyethylene waxes for the natural or synthetic wax components disclosed above. Polishes of this type, containing a polyethylene wax, are disclosed in the following U.S. Patents 2,928,797; 2,874,137; and 2,964,487. These polyethylene materials, which are formulated into liquid polishes in the form of an aqueous emulsion, have heretofore been the only form of stably emulsified polyethylene available to the prior art.

The prior art polyethylenes are oxygenated and are produced by telomerization of ethylene and subsequent oxidation of the telomer, or by thermal degradation of high molecular weight polyethylenes to low molecular weight products which are then oxidized, as disclosed in U.S. Patents 2,964,487 and 2,928,797. The emulsifiability of these oxidized polyethylenes is dependent on the hydrophilic oxygenated groups in the oxidized polymers.

These oxygenated materials, for formulation into polishes, rarely exhibit a molecular weight of more than about 3,000, since emulsification of the emulsifiable solids requires their fusion and materials of molecular weight above about 3000 are too viscous to handle as a melt.

Further, the oxygenated polyethylene materials of the prior art have a disagreeable odor which is inherent in the polymer and which taints the emulsions prepared therefrom and products, such as liquid polishes, containing the emulsions.

Also, the prior art emulsifiable polyethylene solids and emulsions prepared therefrom often have a yellow tinge. Although white emulsifiable polyethylenes can also be obtained, it has been noted that these polyethylene solids tend to vary in their color specifications, indicating that color control of the materials is difficult.

Recently, a new class of nonionically and/or anionically emulsified stable aqueous polyethylene latices has been discovered. Latices of this type are disclosed in copending applications Serial No. 44,862, filed July 25, 1960 (now abandoned), and the continuation thereof Serial No. 421,100, filed December 24, 1964, and Serial Nos. 104,711 and 104,763, filed on even date herewith. Because of the considerable detail disclosed in these applications concerning the new stable latices, a recitation of their complete content in the present application is not feasible, but it is to be understood that these copending applications are incorporated herein by reference.

Although the stable latices disclosed in these copending applications, and prepared by direct aqueous emulsion polymerization processes and by post-treatment of the polymerization product, are themselves of considerable interest, it is the nature of the emulsified polyethylene solids contained in these latices which is of particular pertinence to the present application.

The polyethylene solids contained in these latices are substantially oxygen-free (less than about 1 percent), substantially sulfur-free materials (less than about 0.1 percent) having melting points from about 80° to about 115° C. Their average molecular weights are from about 7,000 to about 30,000 or 40,000. Depending on the specific conditions under which they are prepared, the polymers may have inherent viscosities between about 0.25 to about 1.4. The density of these polyethylene solids is between about 0.91 and 0.94 gram/cm.$^3$. Because of their high molecular weight, they are plastic, non-waxy materials showing considerably greater toughness than prior art oxidized polyethylenes. The maximum standard needle penetration of these novel emulsified polyethylene solids is generally lower than for the softer oxygenated polyethylenes, and is, for example, about 2 mm. under a 500 gm. load.

The latex particles, which range in average size between about 0.02 micron and about 0.5 micron, may have from about 30 percent to about 80 percent of their total available surface area covered with the emulsifying agent used in their preparation. However, good liquid polishes are also made from latices post-stabilized with additional emulsifier as disclosed in copending application Serial No. 104,711. The particles in their latices are saturated with one or more emulsifying agents so that the particle surface is substantially 100 percent covered with the agents.

As emulsifying agents suitable for use in the latices described in the copending applications are materials such as salts of saturated fatty acids having 12–18 carbon atoms, salts of sulfonates of saturated fatty alcohols having 12–18 carbon atoms, salts of sulfonates of ethoxylated fatty alcohols having about 12–18 carbon atoms and an average number of ethoxy groups between 1 and 5, and certain members of the "Triton" series i.e. non-ionic emulsifiers of the formula

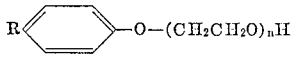

wherein R is an alkyl group having 8 to 9 carbon atoms and wherein $n$ is an average number of from 7 to 15, as disclosed in said abandoned application Serial No. 44,862 and the presently copending continuation thereof Serial No. 421,100.

Perhaps because of their increased hardness, however, the polyethylene solids contained in these latices prepared according to the teachings of these copending applications are not film forming materials. When the latices are applied to a black Carrara glass plate and allowed to dry, the resulting films are highly crazed, rough, pitted, and irregular. These dried latex films, as such, have very poor gloss, and can easily be removed from the glass test plate with the fingernail with flaking, chipping, and cracking.

Although the prior art low molecular weight oxidized polyethylene waxes are described as of "inferior gloss" when compared with waxes such as carnauba, emulsions of these prior art waxes readily form smooth coherent glossy films on black Carrara glass test slabs. In comparison with the smooth films obtained with emulsions of the prior art oxidized polyethylenes, the latices of the copending applications appear far inferior as possible components of a liquid polish. Because of their almost complete lack of film-forming properties on drying at room temperature, the latices would be deemed by one skilled in the art to be substantially lacking in utility as the waxy component of emulsion polishes.

However, liquid aqueous emulsion polishes formulated in a manner known to those skilled in the art with the novel polyethylene latices hereinbefore mentioned are the substantial equal or superior of prior art polyethylene-containing wax emulsion polishes in such standard tests as spreading, leveling, gloss, water-spot resistance, buffability, and removability, and far exceed these prior art compositions in durability as measured by dry-traffic and wet-traffic resistance, for example.

In a liquid polish, such as a household self-polishing liquid floor polish, the gloss of the polish is highly dependent on the particle size of the solids therein. Small particle sizes and high gloss are related, and the good gloss of the polishes prepared according to the invention is believed in large part due to the small particle sizes of the polyethylene solids they contain. The new polyethylene latices herein described can be prepared with the particles in an average size range between about 0.02 micron and 0.5 micron. Particularly good polishes are obtained when the latex particle size is between about 0.02 micron and about 0.1 micron.

In preparing certain novel polishes of the invention, appropriate quantities of aqueous emulsified resins of the type hereinbefore described, of which many are commercially available under various trade names, and of the polyethylene emulsions of the copending applications hereinbefore described are combined to give a total solids content of between about 5 and 50 percent in the resulting emulsion and in such relative proportions that either component may be between about 5 and 95 percent by weight of the total solids. Although the most durable liquid polishes are obtained according to the present invention when the waxy component of the polishes consists solely of the polyethylene solids of high molecular weight herein disclosed, these polyethylenes can be combined with the natural or synthetic waxes heretofore known in the art in all proportions. The most interesting materials are obtained when the polyethylene component is at least 25 percent of the total wax component present. (Techniques for the emulsification of prior art waxes are well known in the art. For example, carnauba wax can be emulsified by melting at 210° F. and adding oleic acid such that the resulting mixture contains 600 parts by weight of wax and 120 parts by weight of acid. Seventy-five parts by weight of morpholine are then stirred into the melt and hot water incrementally added to form the resulting emulsion.)

Generally, the aqueous resin components and aqueous polyethylene latices are advantageous mixed to form a polish when the individual resin solutions or dispersions and the polyethylene latex contain between about 5 and about 50 parts by weight of emulsified solids. The novel polyethylene latices of the aforementioned copending applications can be concentrated to a high solids content of about 40–50 percent without loss of latex stability, which exceeds considerably the concentrations of about 25–30 percent obtainable in the prior art emulsions of oxidized polyethylenes. Since the usual resin components of liquid polishes are also available as highly concentrated dispersions (i.e. substantially saturated with dispersed particles from the point of view of dispersion stability), for the first time it appears feasible to prepare liquid polish concentrates containing mixed resins and polyethylene solids in high concentrations of about 45–50 percent by weight. Such concentrates are of considerable importance, since they afford a convenient form for shipping and marketing polishes. Before use, the concentrates are merely diluted with water to any desired lower solids concentration.

Additional leveling agents, plasticizers, fluxes, and emulsifiers can be combined into the resulting composition. Depending on the final uses of the waxes and the properties desired therein, wide discretion is given to those skilled in the art for adding materials of this type.

Particularly interesting polish compositions are obtained according to the methods of the present invention when the emulsified polishes of the invention omit the resin component entirely or, to restate, employ the novel polyethylene latices disclosed in the earlier mentioned copending applications as the resin component in combination with waxy materials known in the prior art. As the waxy component, the natural and synthetic waxes earlier mentioned herein can be employed, as can low molecular weight waxy polyethylenes of the type described in U.S. Patents 2,928,797, etc. (cf. supra). Because of the unusual hardness of the polyethylene solids contained in the latices mentioned herein, they can successfully be employed as the resin component of a waxy polish, in place of polystyrene, for example. In embodiments of this type, the total solids content of the polishes, the relative ratios of resin component (i.e., the high molecular weight polyethylene materials herein disclosed), and of waxy component (i.e., natural or synthetic waxes, including the low molecular weight polyethylenes of the prior art) are the same as those earlier disclosed in this specification for liquid polishes. Similarly, appropriate leveling agents, plasticizers, fluxes, and emulsifiers can be included in the resulting polishes.

A better understanding of the invention and of its numerous advantages can be had by referring to the following specific examples given by way of illustration.

EXAMPLE 1

*Polyethylene latex A.*—A polyethylene latex was prepared according to Example 1 of copending application Serial No. 104,763 by charging an autoclave with a solution of 85.5 parts of distilled water, 9.5 parts of tertiary butanol, 2.90 parts of myristic acid, 0.71 part of potassium hydroxide, and 0.42 part of tripotassium phosphate. With the autoclave at 80° C., polymerization grade ethylene was introduced into the autoclave to bring the pressure to 1500 lb./sq. in. A solution consisting of 0.08 part of potassium persulfate dissolved in 5 parts of water was pumped in, and the pressure was increased to 3000 lb./sq. in. by pumping in more ethylene. The pressure and temperature were maintained at 3000 lb./sq. in. and 80° C. respectively until periodic sampling showed that polymerization had proceeded to a solids content of 25.4 percent in the latex product. The resulting fluid milky latex was stripped of tertiary butanol and concentrated by evaporation to 36.2 percent total solids.

The latex was then post-stabilized according to Example 3 of copending application Serial No. 104,711 by titration of a sample of the latex with a standard solution of potassium myristate to determine the degree of coverage of the particle surface by emulsifier. A quantity of potassium myristate emulsifier (as an aqueous solution of myristic acid and potassium hydroxide) was then added to the latex substantially to saturate the latex particles with emulsifier.

One hundred parts of this latex, in which the polyethylene has a molecular weight of about 14,000, a density of 0.922 gram per cc., and an average particle diameter of 0.03 micron, and containing 39.8 percent solids, were stirred at room temperature for about ½ hour to insure thorough mixing with 165 parts of water. The resulting latex contained:

| | Parts |
|---|---|
| Polyethylene latex (39.8 percent solids) | 37.7 |
| Water | 62.3 |
| | 100.0 |

*Polystyrene latex.*—Three hundred six parts of a commercial polystyrene latex containing 40 percent solids ("NeoRez ST") were mixed at room temperature with 1.25 parts of tributoxyethyl phosphate ("KP–140") and 3.8 parts of dibutyl phthalate, the plasticizers having been premixed. After mixing for about ½ hour, 538.95 parts of water were added with continued stirring until the dispersion was well mixed. The resulting latex contained:

| | Parts |
|---|---|
| Polystyrene latex (40 percent solids) | .36 |
| Tributoxyethyl phosphate | 0.15 |
| Dibutyl phthalate | 0.45 |
| Water | 63.4 |
| | 100.0 |

*Alkali-soluble resin solution.*—Water (705.5 parts) was heated to 150° F. in a suitable container. Ammonium hydroxide (17 parts, 28 percent) was added with stirring. Shellac (refined, 127.5 parts) was then sifted into the alkaline water and stirred for five to ten minutes. Small quantities of additional ammonium hydroxide were added as required to dissolve the shellac. The solution was stirred another 15 minutes, cooled to room temperature, and diluted to compensate for loss of water due to evaporation. The resulting solution contained:

| | Parts |
|---|---|
| Refined shellac | 15.0 |
| 28 percent ammonium hydroxide | 2.0 |
| Water | 83.0 |
| | 100.0 |

A polish drying to a bright coating and having outstanding resistance to rubber heel marking was prepared by mixing 30 parts of polyethylene latex A, 55 parts of the polystyrene emulsion, 15 parts of the ammonia-cut shellac, and 0.2 part of n-octanol in the order listed.

EXAMPLE 2

*Polyethylene latex B.*—A polyethylene latex was prepared according to Example 13 of copending application Serial No. 104,763 by charging an autoclave with a solution of 79.5 parts of distilled water, 15.5 parts of tertiary butanol, 1.09 parts of myristic acid, 0.318 part of potassium hydroxide, and 0.42 part of tripotassium phosphate. Ethylene was introduced into the autoclave under pressure. A solution of 0.12 part of potassium persulfate in 5 parts of distilled water was pumped in The pressure and temperature were maintained at 3000 lb./sq. in. and 80° C. respectively until polymerization had proceeded to a solids content of 26.4 percent in the latex product. The latex was stripped of tertiary butanol and concentrated by evaporation to 36.4 percent total solids.

The latex was then post-stabilized according to Example 2 of copending application Serial No. 104,711 by tensiometric titration of a sample of the latex with potassium myristate to determine the degree of coverage of the particle surface by emulsifier. A quantity of potassium myristate emulsifier (as an aqueous solution of myristic acid and potassium hydroxide) was then added to the latex substantially to saturate the latex particles with emulsifier.

One hundred parts of this latex, containing polymer having a molecular weight of about 30,000, a density of 0.923 gram/cc., an average particle diameter of 0.08 micron, and having a total solids content of 40.1 percent, were mixed at room temperature with 167 parts of water for a period of about ½ hour. The resulting composition contained:

| | Parts |
|---|---|
| Polyethylene latex (40.1 percent solids) | 37.4 |
| Water | 62.6 |
| | 100.0 |

*Polyacrylate emulsion.*—One hundred parts of a commercial polyacrylate latex containing 40 percent total solids ("U–3101 Ubatol") in which the polymer has a molecular weight greater than 150,000 and an average particle size of 0.05 micron were mixed at room temperature with 167 parts of water and stirred for about ½ hour. The resulting emulsion contained:

| | Parts |
|---|---|
| Polyacrylate emulsion (40 percent solids) | 37.5 |
| Water | 62.5 |
| | 100.0 |

By mixing 30 parts of polyethylene latex B, 55 parts of polyacrylate emulsion, 15 parts of ammonia-cut shellac, and 0.2 part of n-octanol in that order and stirring at room temperature until well mixed, there was obtained an emulsion floor-finishing composition of the "dry-bright" type having superior wear properties.

EXAMPLE 3

*Polyethylene latex C.*—A polyethylene latex was prepared according to Example 12 of copending application Serial No. 104,763 by charging an autoclave with 82.5 parts of distilled water, 12.5 parts of tertiary butanol, 1.77 parts of myristic acid, 0.51 part of potassium hydroxide, and 0.42 part of tripotassium phosphate. Ethylene was introduced into the autoclave under pressure. A solution of 0.12 part potassium persulfate in 5 parts of distilled water was pumped in. The pressure and temperature were maintained at 3000 lb./sq. in. and 80°–97° C. respectively until polymerization had proceeded to a solids content of 21.0 percent in the latex product. The latex was stripped of tertiary butanol and concentrated by evaporation.

One hundred parts of this latex, containing polymer having a molecular weight of about 17,000, a density of 0.920 gram/cc., an average particle diameter of about 0.04 micron, and having a total solids content of 38.4 percent, were mixed at room temperature with 156 parts of water for about ½ hour. The resulting composition contained:

| | Parts |
|---|---|
| Polyethylene latex (38.4 percent solids) | 39.0 |
| Water | 61.0 |
| | 100.0 |

30 parts of polyethylene latex C, 55 parts of polyacrylate emulsion of Example 2, 15 parts of ammonia-cut shellac of Example 1, and 0.2 part of n-octanol were stirred at room temperature until well mixed, to obtain an emulsion floor-finishing composition of the "dry-bright" type strikingly superior in wearability.

EXAMPLE 4

*Polyethylene latex D.*—One hundred parts of a polyethylene latex in which the polyethylene had a molecular weight of about 19,000, a density of about 0.938 gram per cc., and an average particle diameter of 0.06 micron, prepared according to abandoned application Ser. No. 44,862 and its presently copending continuation Serial No. 421,100 employing the non-ionic emulsifying agents disclosed therein and containing 39.4 percent solids were stirred at room temperature for about ½ hour with 163 parts of water. The resulting latex contained:

| | Parts |
|---|---|
| Polyethylene latex (39.4 percent solids) | 38.0 |
| Water | 62.0 |
| | 100.0 |

Thirty parts of polyethylene latex D, 55 parts of the polystyrene emulsion of Example 1, 15 parts of the ammonia-cut shellac of Example 1, and 0.2 part of n-octanol were stirred at room temperature until well mixed, to obtain a highly wear-resistant emulsion floor finishing composition of the "dry-bright" type.

EXAMPLE 5

30 parts of the polyethylene latex B of Example 2, 55 parts of the polystyrene emulsion of Example 1, 15 parts of the ammonia-cut shellac of Example 1, and 0.2 part of n-octanol were stirred at room temperature until well mixed, to obtain an emulsion floor-finishing composition of the "dry-bright" type superior in wearability to similar materials prepared with oxidized polyethylene waxes.

EXAMPLE 6

30 parts of the polyethylene latex A of Example 1, 55 parts of the polyacrylate emulsion of Example 2, 15 parts of the ammonia-cut shellac of Example 1, and 0.2 parts of n-octanol were stirred at room temperature until well mixed, to obtain a highly wear-resistant emulsion floor finishing composition of the "dry-bright" type.

EXAMPLE 7

30 parts of the polyethylene latex C of Example 3, 55 parts of the polystyrene emulsion of Example 1, 15 parts of the ammonia-cut shellac of Example 1, and 0.2 part of n-octanol were stirred at room temperature until well mixed, to obtain a highly superior emulsion floor-finishing composition of the "dry-bright" type superior in gloss and strikingly superior in wearability to similar materials prepared from oxidized polyethylene waxes.

EXAMPLE 8

30 parts of the polyethylene latex D of Example 4, 55 parts of the polyacrylate emulsion of Example 2, 15 parts of the ammonia-cut shellac of Example 1, and 0.2 part of n-octanol were stirred at room temperature until well mixed, to obtain a wear-resistant emulsion floor-finishing composition of the "dry-bright" type.

EXAMPLE 9

*Oxidized polyethylene emulsion.*—107 parts of a low molecular weight oxidized polyethylene commercially available under the trade name "AC–629," 8 parts of singly distilled oleic acid, and 8 parts of a non-ionic emulsifier ("Emulphor ON–870") were heated together at a temperature of 210–220° F. Thirteen parts of morpholine were added to the wax melt with stirring. 684 parts of water were preheated to a temperature of 200–210° F. and rapidly stirred while the wax melt was added directly to the water. The resulting emulsion contained:

| | Parts |
|---|---|
| Oxidized polyethylene ("AC–629") | 13 |
| Oleic acid | 1 |
| Nonionic emulsifier | 1 |
| Morpholine | 1.5 |
| Water | 83.5 |
| | 100.0 |

30 parts of oxidized polyethylene emulsion, 55 parts of the polystyrene emulsion of Example 1, 15 parts of the ammonia-cut shellac of Example 1, and 0.2 part of n-octanol were stirred at room temperature until well mixed, to obtain an emulsion floor finishing composition of the "dry-bright" type typical of those prepared with oxidized polyethylene waxes.

EXAMPLE 10

30 parts of the oxidized polyethylene emulsion of Example 9, 55 parts of the polyacrylate emulsion of Example 2, and 15 parts of the ammonia-cut shellac of Example 1, and 0.2 part of n-octanol were stirred at room temperature until well mixed, to obtain an emulsion floor finishing composition of the "dry-bright" type typical of those prepared from oxidized polyethylene waxes.

Each of the emulsion polishes prepared in the foregoing examples were bench tested for the following properties:

*Water-spot resistance.*—The wax polish was applied to a 9 inch by 4 inch official test linoleum panel by vertically dipping the panel to a depth of 4 inches for a period of 10 seconds. The bead of emulsion polish draining to the lower edge of the test panel was wiped away and the panels were placed in a horizontal position to dry for 8 hours at 75° F. and 50 percent relative humidity. Distilled water (1 cc.) was placed on the polish film and allowed to stand for 15 minutes. The drop of water was then removed with a soft absorbent paper or cloth, and the area visually examined for whitening and film removal.

*Gloss.*—Test panels 4 inches by 9 inches in size of official test linoleum, official test asphalt tile, and Amtico rubber tile (nonporous) were cleaned and adjusted to an initial gloss of 7–9, 16–19, and 20–30, respectively. Gloss, as determined with a Gardner 60° gloss meter, was measured after the polishes had dried for a period of 4 hours in a room maintained at 75° F. and 50 percent relative humidity.

*Powdering or dusting.*—A 2 inch by 4 inch area on a rubber test panel was coated with 0.4 cc. of polish by means of a doctor blade. After drying for a period of 24 hours at 77° F. and 50 percent relative humidity, the test panel was placed in a crock meter consisting of a weighted (2-lb.) sliding arm traveling in a horizontal plane on a peg covered with a 2 inch square of green billiard cloth. After 50 strokes, the cloth was removed and observed for adhering white powder to determine the degree of dusting.

*Removability.*—The method outlined in section 3.8 of Federal Specification P–W–155 was employed.

*Leveling.*—The procedure outlined in Federal Specification P–W–784b, Section 4.2.11, was employed.

*Slip resistance.*—The "Proposed Method of Test for Measuring the Static Coefficient of Friction of Waxed Floor Surfaces," ASTM Bulletin No. 196, February 1954, was employed.

*Stability at 125° F.*—The method outlined in Section 3.7 of Federal Specification P-W-155 was used. The test was continued for 30 days.

The results of comparing these polishes by these tests are presented in Table 1.

*Floor service test procedure.*—This test simulated actual service and permitted comparison of performance of one or more floor waxes against a comparison floor wax.

traffic marks evidence of scuff marks. The results of these comparisons appear in Table 2 where:

F=Fair      VG=Very Good
G=Good      E=Excellent

A following numeral indicates order of performance if ratings are equal.

TABLE 1.—RESULTS OF BENCH TESTS OF POLISHES CONTAINING POLYETHYLENE LATICES VERSUS THOSE CONTAINING OXIDIZED POLYETHYLENE

| Example No | 1 | 2 | 3 | 4 | 5 | 6 | 7 | 8 | 9 | 10 |
|---|---|---|---|---|---|---|---|---|---|---|
| Gloss, 60°: | | | | | | | | | (2) | |
|   Linoleum | 26 | 25 | 27 | 23 | 25 | 25 | 28 | 23 | 26 | 28 |
|   Asphalt Tile | 37 | 30 | 34 | 32 | 35 | 32 | 37 | 28 | 36 | 32 |
|   Rubber Tile | 66 | 60 | 64 | 62 | 66 | 64 | 72 | 58 | 72 | 64 |
| Leveling: | | | | | | | | | | |
|   Linoleum | E | E | E | E | VG | E | E | E | E | E |
|   Asphalt Tile | E | E | E | E | E | E | E | E | E | E |
| Removability | Complete Removability | | | | | | | | | |
| Powdering | Moderate | | | | | | | | | |
| Water spot, 8 hrs | A | B | A | A | A | A | A | A | A | A |
| Slip Resistance,[1] | | | | | | | | | | |
|   Asphalt Tile | 0.54 | 0.52 | 0.52 | 0.52 | 0.52 | 0.51 | 0.53 | 0.52 | 0.52 | 0.54 |
| Stability at 125° F | OK, 30 Days | | | | | | | | | |

[1] James Machine.
[2] Oxidized Polyethylene.

TABLE 2.—RESULTS OF FLOOR SERVICE TESTS OF POLISHES CONTAINING POLYETHYLENE LATEX VERSUS THOSE CONTAINING OXIDIZED POLYETHYLENE

| | | | | | | | | | Oxidized-Polyethylene | |
|---|---|---|---|---|---|---|---|---|---|---|
| Example No | 1 | 2 | 3 | 4 | 5 | 6 | 7 | 8 | 9 | 10 |
| Visual Gloss: | | | | | | | | | | |
|   Initially | VG | VG | VG | G | VG | VG | VG | G | VG | VG |
|   At 2 weeks | G-1 | G-1 | G-1 | G-2 | G-1 | G-1 | G-1 | G-2 | G-1 | G-1 |
|   At 3 weeks | G | G-1 | G-1 | G | G | G-1 | G | G-2 | G | G-1 |
| Leveling | E | E | E | E | E | E | E | E | E | E |
| Yellowing | None | None | None | None | None | None | None | None | None | None |
| Slip Resistance: | | | | | | | | | | |
|   Initially | G | G | G | G | G | G | G | G | G | G |
|   At 2 weeks | G | G | G | G | G | G | G | G | G | G |
|   At 3 weeks | G | G | G | G | G | G | G | G | G | G |
| Soil Resistance: | | | | | | | | | | |
|   At 1 week | VG | VG | VG | VG | VG | VG | VG | VG | VG | VG |
|   At 2 weeks | G-1 | VG-1 | VG-1 | G-1 | G-1 | VG-1 | G-1 | VG-1 | G-2 | VG-2 |
|   At 3 weeks | G-1 | G-1 | G-1 | G-1 | G-1 | G-1 | G-1 | G-1 | G-2 | G-2 |
| Rubber heel mark resistance: | | | | | | | | | | |
|   At 1 week | VG | E | E | VG | VG | E | VG | E | G | VG |
|   At 2 weeks | VG | E | E | VG | VG | E | VG | E | F | G |
|   At 3 weeks | VG | VG | VG | VG | VG | VG | VG | VG | F | F |

Gloss, resistance to soiling, resistance to heel marking and scuffing, and buffability were evaluated by visual observations by a panel of three persons trained in assessing the general appearance and properties of floor panels. The tests consisted of sixteen 9 inch squares of white and black asphalt tiles arranged in a checkerboard pattern and attached to a stiff backing. The panels were thoroughly cleaned and dried before application of the test waxes. Two coats of the wax to be tested were applied to the floor panels at the rate of approximately 1500 square feet per gallon. Application of the first and second coats of polish was separated by a period of 1 hour. After drying for 1 hour, the panels were buffed and installed in the test area. The test panels were maintained by daily sweeping and weekly damp mopping, using clear, cold water. Immediately after drying, the panels were buffed with a power buffer. Also, the panels were shifted during the test in order to equalize traffic across the panels being used. Weekly observations were made by the panel members immediately after the test panels were damp mopped and buffed on the following properties: (1) gloss and overall appearance; (2) slip resistance; (3) soil resistance (this is distinguished from resistance to heel marks and scuff marks and pertains only to imbedded soil which shows up on the white asphalt tile panels); and (4) resistance to heel marking and scuffing. Discoloring traffic marks are considered evidence of heel marking and nondiscoloring

EXAMPLE 11

*Alkali soluble resin.*—Water (686.5 parts) was heated to 150° F. in a suitable container. Ammonium hydroxide (36.0 parts, 28 percent) was added with stirring. An alkali soluble synthetic resin ("Shanco L-334," 127.5 parts) was then sifted into the alkaline water and stirred for five to ten minutes. Small quantities of additional ammonium hydroxide were added as required to dissolve the resin. The solution was stirred another fifteen minutes, cooled to room temperature, and diluted to compensate for loss of water due to evaporation. The resulting solution contained:

| | Parts |
|---|---|
| Alkali soluble resin | 15.0 |
| Ammonium hydroxide | 4.2 |
| Water | 80.8 |
| | 100.0 |

By mixing 44 parts of polyethylene latex B as prepared in Example 2, 44 parts of a modified polyacrylate latex ("Rhoplex B-78") diluted as in Example 2, 12 parts of the alkali-soluble resin solution ("Shanco L-334") prepared above, 1.6 parts of a 1 percent aqueous solution of a fluoro compound ("FC-128"), and 1.5 parts of "Carbitol," there was obtained a polish having an excellent gloss of 84 when applied to a "Durez" gloss test sheet.

EXAMPLE 12

A polish was prepared as in Example 11 but using 66 parts of the polyethylene emulsion and 22 parts of the polyacrylate emulsion. The gloss of this polish, when tested on a "Durez" test sheet, was found to be 70.

Although specific embodiments have been shown and described, it is to be understood that they are illustrative, and are not limiting on the scope and spirit of the invention.

We claim:

1. A liquid polish composition comprising an aqueous dispersion of particles of substantially oxygen-free, substantially sulfur-free polyethylene, said particles having an average particle size between about 0.02 micron and about 0.5 micron, in combination with at least one member selected from the group consisting of dispersed particles of a wax and dispersed particles of a resin, said wax and resin being conventional in liquid polish compositions, said particles of polyethylene being selected from the group consisting of:

(1) non-ionically emulsified polyethylene particles prepared by polymerizing ethylene in an aqueous medium containing dissolved therein a water-soluble persulfate polymerization initiator and an emulsifying agent consisting essentially of a non-ionic compound of the formula

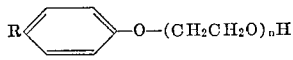

wherein R represents an alkyl group having 8 to 9 carbon atoms and wherein $n$ is an average number of from 7 to 15, to form a stable aqueous emulsion, said resulting emulsion comprising (a) a continuous aqueous phase, (b) said non-ionic compound, and (c) a plurality of polyethylene particles, at least a portion of the polyethylene in said particles being modified by chemical combination with said non-ionic compound;

(2) anionically emulsified polyethylene particles prepared by polymerizing ethylene at temperatures between about 70° C. and about 100° C. and at pressures between about 2100 pounds per square inch and about 5000 pounds per square inch in the presence of an aqueous polymerization medium consisting essentially of water, a persulfate initiator not exceeding about 0.5 percent by weight of the aqueous polymerization medium, and from about 0.9 to about 9 percent by weight of the aqueous polymerization medium of a member selected from the group consisting of (a) a salt of a saturated fatty acid having 12–18 carbon atoms in combination with a pH adjuster maintaining the pH of said aqueous medium above about 8.5, (b) a salt of a sulfate of a saturated fatty alcohol having about 12–18 carbon atoms, and (c) a salt of a sulfate of an ethoxylated saturated fatty alcohol containing 12–18 carbon atoms and an average number of ethoxy groups between 1 and 5, to form a stable aqueous emulsion; and (3) anionically emulsified polyethylene particles prepared by polymerizing ethylene as in (2) immediately above to form a stable aqueous emulsion, except that said aqueous polymerization medium additionally comprises about 5–25 percent of t-butanol by weight of the aqueous polymerization medium.

2. A polish composition as in claim 1 wherein said composition comprises dispersed particles of said polyethylene and dispersed particles of a resin.

3. A polish composition as in claim 1 wherein said composition comprises dispersed particles of polyethylene in combination with dispersed particles of a wax.

4. A polish composition as in claim 1 wherein said dispersed particles of a wax are dispersed particles of oxidized polyethylene.

5. A polish composition as in claim 1 wherein said polyethylene has an inherent viscosity between about 0.25 and about 1.4.

6. A liquid polish concentrate adaptable to dilution with water and comprising an aqueous phase and about 45–50 percent, by weight of said concentrate, of dispersed particles of a substantially oxygen-free, substantially sulfur-free polyethylene, said particles having an average size between about 0.2 micron and about 0.5 micron, in combination with dispersed particles of a resin conventional in liquid polish compositions, said particles of polyethylene being selected from the group consisting of:

(1) non-ionically emulsified polyethylene particles prepared by polymerizing ethylene in an aqueous medium containing dissolved therein a water-soluble persulfate polymerization initiator and an emulsifying agent consisting essentially of a non-ionic compound of the formula

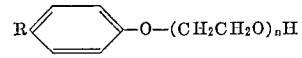

wherein R represents an alkyl group having 8 to 9 carbon atoms and wherein $n$ is an average number of from 7 to 15, to form a stable aqueous emulsion, said resulting emulsion comprising (a) a continuous aqueous phase, (b) said non-ionic compound, and (c) a plurality of polyethylene particles, at least a portion of the polyethylene in said particles being modified by chemical combination with said non-ionic compound;

(2) anionically emulsified polyethylene particles prepared by polymerizing ethylene at temperatures between about 70° C. and about 100° C. and at pressures between about 2100 pounds per square inch and about 5000 pounds per square inch in the presence of an aqueous polymerization medium consisting essentially of water, a persulfate initiator not exceeding about 0.5 percent by weight of the aqueous polymerization medium, and from about 0.9 to about 9 percent by weight of the aqueous polymerization medium of a member selected from the group consisting of (a) a salt of a saturated fatty acid having 12–18 carbon atoms in combination with a pH adjuster maintaining the pH of said aqueous medium above about 8.5, (b) a salt of a sulfate of a saturated fatty alcohol having about 12–18 carbon atoms, and (c) a salt of a sulfate of an ethoxylated saturated fatty alcohol containing 12–18 carbon atoms and an average number of ethoxy groups between 1 and 5, to form a stable aqueous emulsion; and (3) anionically emulsified polyethylene particles prepared by polymerizing ethylene as in (2) immediately above to form a stable aqueous emulsion, except that said aqueous polymerization medium additionally comprises about 5–25 percent of t-butanol by weight of the aqueous medium.

References Cited by the Examiner

UNITED STATES PATENTS

| | | | |
|---|---|---|---|
| 2,653,919 | 9/1953 | Hunter | 260—23 |
| 2,695,277 | 11/1954 | Pabst et al. | 260—28.5 |
| 2,874,137 | 2/1959 | Pisanchyn et al. | 260—23 |
| 2,928,797 | 3/1960 | Brunson et al. | 260—23 |
| 2,937,098 | 5/1960 | Geen | 260—28.5 |

FOREIGN PATENTS 798,565  7/1958  Great Britain.

DONALD E. CZAJA, *Primary Examiner.*

MILTON STERMAN, LEON J. BERCOVITZ,
*Examiners.*